United States Patent [19]
Yasuda

[11] 4,236,847
[45] Dec. 2, 1980

[54] METAL CORNER FITTINGS FOR PICTURE FRAMES

[76] Inventor: Hiroaki Yasuda, 17-go, 9-ban, Kumoi-cho, Nishinomiya, Hyogo Prefecture, Japan

[21] Appl. No.: 3,478

[22] Filed: Jan. 12, 1979

[30] Foreign Application Priority Data

| Mar. 27, 1978 | [JP] | Japan | 53/39947 |
| Jun. 1, 1978 | [JP] | Japan | 53/75305 |
| Aug. 14, 1978 | [JP] | Japan | 53/111756 |
| Sep. 27, 1978 | [JP] | Japan | 53/133417 |

[51] Int. Cl.² ................................................ G09F 1/12
[52] U.S. Cl. ..................... 403/402; 403/205; 40/155
[58] Field of Search ............ 403/402, 401, 403, 205; 40/152, 155

[56] References Cited
U.S. PATENT DOCUMENTS

| 579,722 | 3/1897 | Petersen | 403/401 |
| 909,561 | 1/1909 | Dolcater | 403/403 |
| 3,965,601 | 6/1976 | Nielsen | 403/401 X |

FOREIGN PATENT DOCUMENTS

| 292624 | 6/1916 | Fed. Rep. of Germany | 403/401 |
| 36883 | 6/1914 | Sweden | 403/402 |
| 265089 | 2/1927 | United Kingdom | 403/403 |

Primary Examiner—Andrew V. Kundrat
Attorney, Agent, or Firm—Wenderoth, Lind & Ponack

[57] ABSTRACT

A metal corner fitting for a wooden picture frame having two leg pieces, the leg pieces having screw slits thereon which form an angle α between the back thereof and the back of a picture frame with the outside edge of the leg pieces making contact with the back of the frame piece. The screw slits extend through the leg pieces at a slight angle so that they are inclined toward the corner portion of the corner metal fitting at an angle β.

6 Claims, 13 Drawing Figures

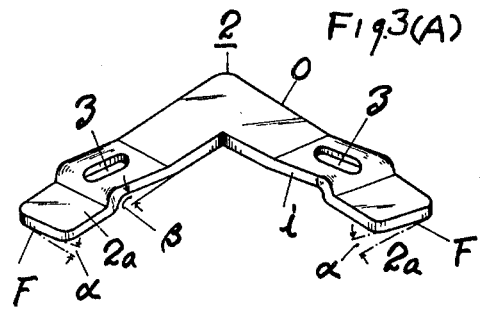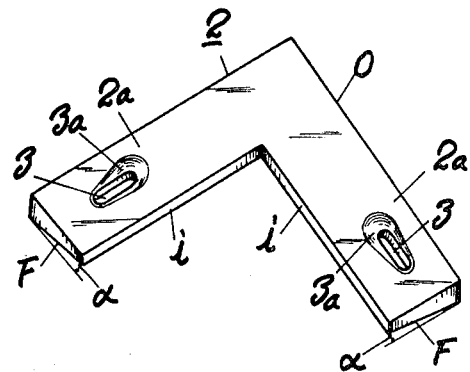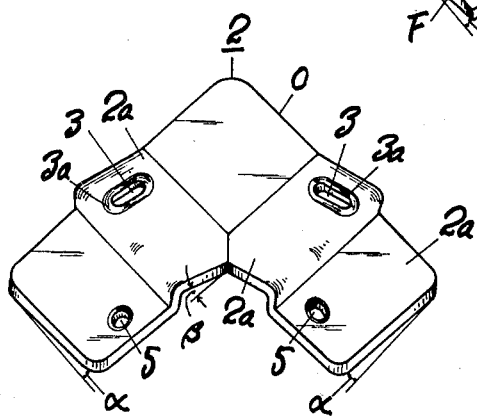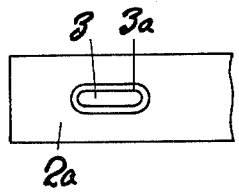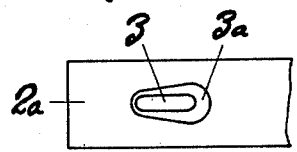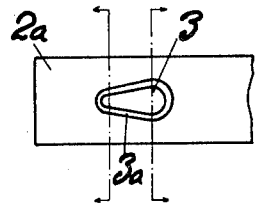

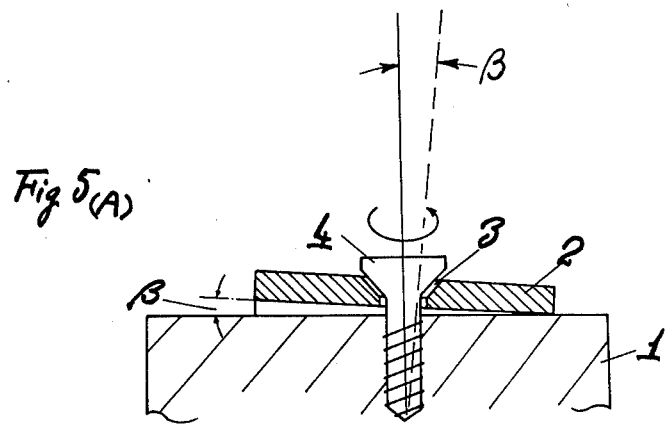
Fig. 5(A)
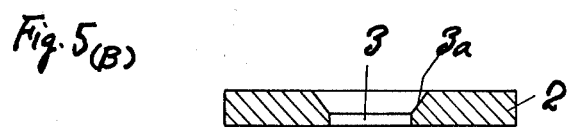
Fig. 5(B)
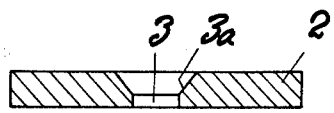
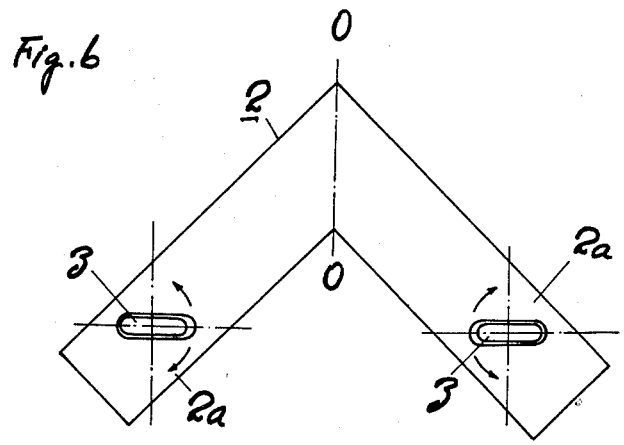
Fig. 6

METAL CORNER FITTINGS FOR PICTURE FRAMES

BACKGROUND OF THE INVENTION

This invention relates to metal corner fittings for use in firmly assembling a wooden picture frame made up of frame pieces.

In assembling a wooden picture frame, it is a usual practice to cut engraved and colored frame pieces in desired lengths, apply a bonding agent to the cut ends of each frame piece, abut the cut ends of the frame pieces against each other, bind a string around the assembled frame or place the assembled frame in a supporting frame and leave the assembled frame therein until the bonding agent dries and hardens completely. In some cases, each corner of a picture frame is secured by screwing or by nailing, instead of secured with a bonding agent. However, when a bonding agent is used it becomes quite complicated to assemble the frame since it is required that it be bound with a string. In the case of screwing or nailing it becomes difficult to ensure accurate, tight abutment of the frame pieces to each other.

SUMMARY OF THE INVENTION

The present invention is designed to provide L-shaped metal corner fittings which do not have the above-described disadvantages of the conventional methods of assembling picture frame.

An L-shaped metal corner fitting according to the present invention has two leg pieces which are shaped so that when they are rested on the back of a picture frame, there exists a gap because the back of the two leg pieces form an angle $\alpha$ with the back of the picture frame. An outer edge of each leg portion makes contact with the back of the picture frame (as shown in FIG. 3) each leg piece has screw holes which are inclined toward a corner portion of the frame at an angle $\beta$ from the perpendicular axis to the leg pieces so that the corner portions of the L-shaped metal fittings can be shaped so as to be slightly lower than the screw hole portions. The metal corner fitting described affords tight and accurate abutment of frame pieces to each other and has the same adhesive strength as a bonding agent.

BRIEF DESCRIPTION OF THE DRAWINGS

The nature and advantages of the present invention will be understood clearly from the following description of the present invention made with reference to the accompanying drawings, in which:

FIGS. 3 (A), (B) and (C) are different embodiments of the fittings according to the present invention and FIGS. 3 (D), (E) and (F) are plan views of the different metal corner fittings, each showing the shape of a screw hole which is located in a metal corner fitting;

FIG. 5 is a cross sectional view of the L-shaped metal corner fitting shown in FIG. 2, taken along line V—V, in which FIG. 5 (A) is the L-shaped metal corner fittings shown in FIGS. 3 (A), (B), (C), (D) and (E) and FIG. 5 (B) is the L-shaped corner metal fitting having screw holes shown in FIG. 3 (F); and FIG. 6 is a diagrammatic view showing the orientation of the screw holes in the leg portions.

FIG. 1 is a perspective view of an assembled picture frame. A picture frame normally comprises four frame pieces 1 which are equal in length in the case of a square picture frame or with each two opposite frame pieces equal in length in the case of a rectangular picture frame. Cut ends of each frame piece 1 have a bonding agent applied thereto and metal corner fittings 2 are fitted to the back of a picture frame at the portion where two frame pieces abut. Metal corner fittings 2 can be made of any material, provided that the strength of the material is adequate for holding the frame pieces together. The fittings are usually made of metal or synthetic resin and have an L-shape. In order to form an angle $\alpha$ between the top surface of L-shaped metal corner fittings 2 which is in a plane and the bottom of the metal fitting, each of leg pieces 2a are tapered on the bottom to be thinner toward their inside edge i and thicker toward their outside edge o as shown by F in FIG. 3 (B), or each of the two leg pieces 2a are bent a slight amount, as shown by F in FIG. 3 (A). It is advisable that L-shaped corner fittings as shown by FIG. 3 (A) be made of metal and those as shown by FIG. 3 (B) be made of synthetic resin.

Figure 1:
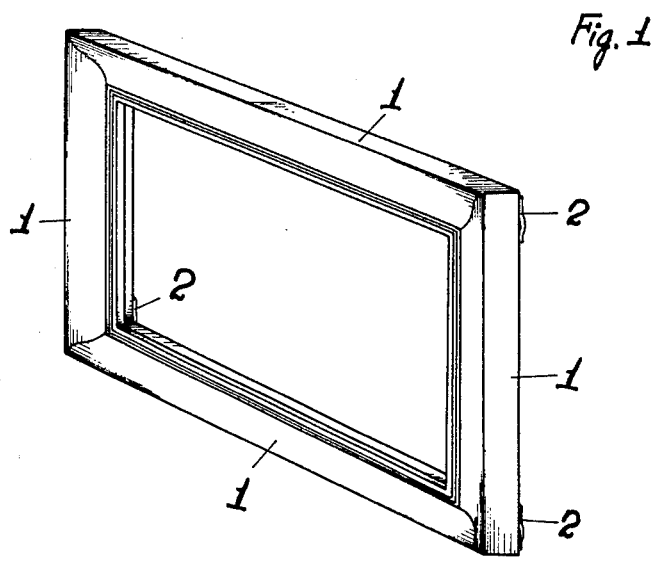
FIG. 1 is a perspective view of an assembled picture frame.
Figure 2:
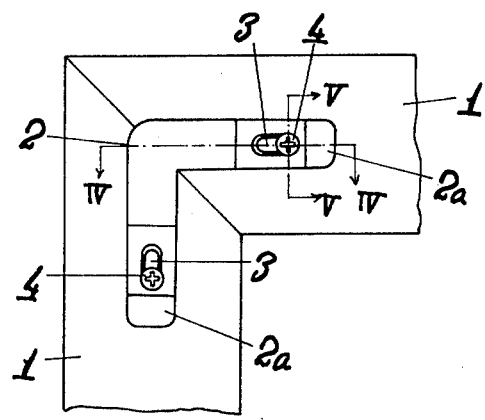
FIG. 2 is a corner portion of an assembled picture frame, as viewed from the back.

When a metal corner fitting having two leg pieces 2a which are tapered in thickness as shown by F in FIG. 3 (B) or bent slightly as shown by F in FIG. 3 (A) is rested on the back of a picture frame, the inside edge i of the leg piece is out of contact with the back of the picture frame but the outside edge o of the leg piece is in contact with the back of the picture frame and thus an angle $\alpha$ is formed between the back of the leg piece and the back of the picture frame. The angle $\alpha$ is determined so that when a screw is driven through a screw hole and is driven into a frame piece, the cut ends of two frame pieces abut against each other tightly and uniformly due to the interaction of the screws with the fitting and the frame through the angle $\alpha$.

A screw hole 3 which is shaped like a slit is located in each leg piece 2a. This slit 3 is tapered in diameter from the outer surface side (the side which does not make contact with a frame piece) to the back side. A part of the leg piece 2a where the slit 3 is located is bent slightly so that the leg piece 2a slants toward the corner portion at an angle, from the top planar surface portion of the leg pieces of $\beta$, as shown in FIGS. 3 (A) and (C) and FIG. 4 (A). This angle $\beta$ can also be formed by inclining countersink 3a at the screw slit as shown in FIGS. 3 (B) and (E) and FIG. 4 (B). The same effect can also be accomplished by making a slit having a tapering elliptical shape in a leg piece as shown in FIG. 3 (F), which is smaller in diameter at the outer side of the leg and having a greater diameter on the other side of the leg piece. This difference in diameters between the two sides corresponds to the angle $\beta$ as shown in FIGS. 3 (A) and (B) and FIGS. 4 (A) and (B), and screws having different diameters can be used in the previously described screw slits. The shape of the abovedescribed screw slits can be either elliptically as shown in FIGS. 3 (A), (B), (C), (D) and (E) or tapering elliptical as shown in FIG. 3 (F).

With regard to the various possible combinations of the shapes of the screw slits, angle α at F and angle β at the screw slit, they can be achieved by the combinations shown in the following table. Any of the combinations shown in the table as being effective produces the same effect.

Figure 4A:
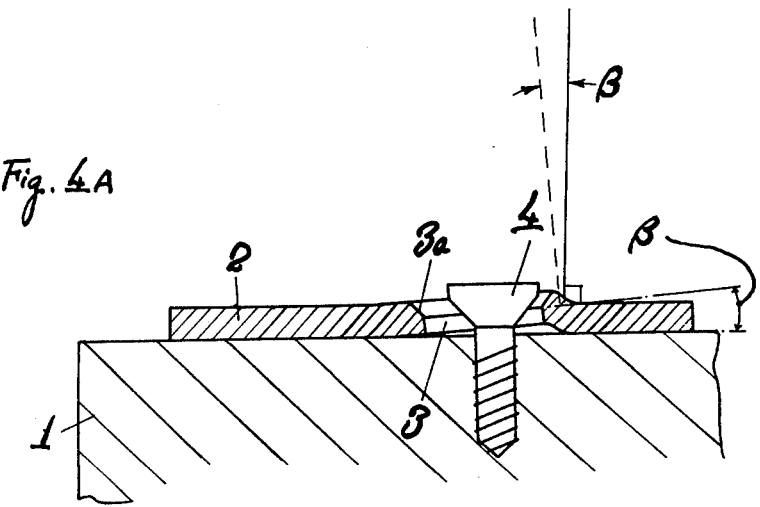
FIGS. 4 A and B are cross sectional views of an L-shaped metal corner fitting, taken along the line IV—IV in FIG. 2, in which FIG. 4 (A) is the L-shaped metal corner fitting shown in FIG. 3 (A) and FIG. 4 (B) is the L-shaped metal corner fitting shown in FIG. 3 (B)
Figure 4B:
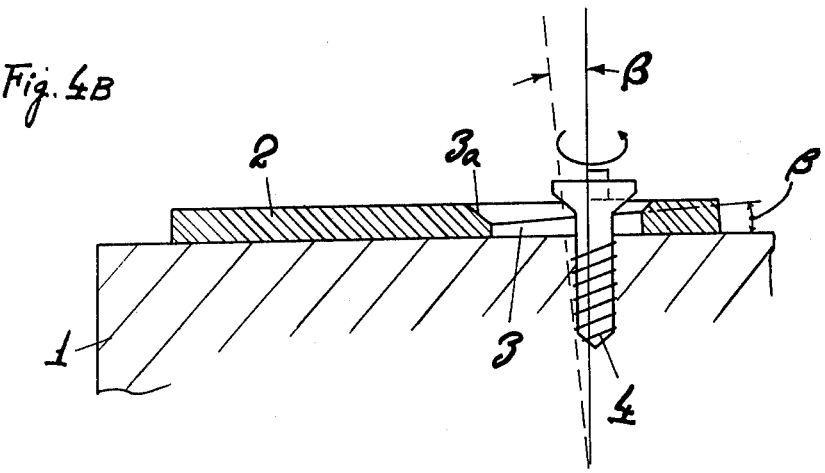

| | Angle β | | |
|---|---|---|---|
| Angle α | Method of bending a part of the leg piece where a screw slit is made, as shown in FIG. 4 (A) | Method of slanting a countersink at the screw slit, as shown in FIG. 4 (B) | Method of making the diameters at both ends of the screw slit different, as shown in FIG. 3 (F) |
| Method of bending slightly one edge side of a leg piece, as shown in FIG. 3 (A) | yes | no | 0 |
| Method of making the thickness at the outside edge and the inside edge different, as shown in FIG. 3 (B) | no | yes | 0 |

The above-described screw slits are made in a way so that the major axis extends in the lengthwise direction of each leg piece. But as shown in FIG. 6, the screw slits can be made in a way so that they cross the center line O—O at right angles or at a desired angle, in which case the inner side of the leg piece is formed to be slightly lower than the outer side thereby producing the same effect as in the previously described cases.

When assembling a picture frame from the frame pieces which are cut in desired lengths by using the above-described metal fittings, a bonding agent to cut ends of each frame piece, the cut ends of each frame piece are abutted against each other, an L-shaped metal corner fitting 2 is placed on the back of each corner portion of the picture frame, a screw 4 is inserted in each screw slit 3 and driven into the frame piece. By driving the screw 4 therein, the dish-shaped inner surface of a screw head is forced to contact the countersink 3a tightly in the lengthwise direction of the screw slit. The inner surface of the screw head thereby slides along the countersink 3a at an angle β according to the degree of driving force exerted on the screw so that the metal corner fitting is pressed by the external force being exerted in the direction in which the fitting is forced to separate from abutment with the frame pieces. This external force acts on each frame piece in a way that it forces each frame piece toward abutment with each other. Further driving of the screw 4 forces the frame pieces to abut against each other more strongly with the screw ceasing its sliding movement along the countersink 3a. However, since there exists a gap defined by the surfaces which are at an angle α between the inner surface of the metal corner fitting and the back of the frame piece, the abutment of frame pieces is uniform throughout this entire surface. Screw holes 5 which are located in a metal corner fitting as shown in FIG. 3 (C) serve to further lighten the abutting frame pieces against each other.

According to the present invention, abutment of the frame pieces can be done tightly and uniformly without gaps left between frame pieces only by fitting metal corner fittings to the corner portion of a picture frame by screwing them thereon. In the case where the screw slit has an egg-shape or tapering ellipsoid shape with different diameters at both ends thereof, screws of different sizes can be used. The present invention has various features for allowing easy and yet accurate and tight assembling of a picture frame regardless of frame sizes.

What is claimed is:

1. A metal corner fitting for a wooden picture frame, comprising:
   two leg pieces attached to each other to form an L and having a portion of the top surface a flat plane surface, shaped so that the surface opposite the top surface at least at the ends of said leg pieces being at an angle α to said portion of the top surface; said leg pieces further having slits therethrough, with the axes of said slits being inclined slightly through said leg pieces from the perpendicular to said portion of the top surface away from the ends of said leg pieces for allowing screws to be driven therethrough for assembling said picture frame.

2. A metal corner fitting as defined in claim 1 wherein the ends of said leg pieces are bent slightly at said angle α.

3. A metal corner fitting as defined in claim 1 wherein said leg pieces are of differeing thickness along their length with an outer portion of said leg pieces being thickest and tapering decreasingly toward the inner portion of said leg pieces for causing said surface opposite said top surface to be at said angle α.

4. A metal corner fitting as defined in claim 1 wherein said slits are shaped on said top surface of said leg pieces in the form of a tapering ellipse with the greater diameter portion located closest to said portion of said leg pieces where they are attached to each other.

5. A metal corner fitting as defined in claim 1 wherein said leg pieces are bent slightly to form an angle β between said flat plane top surface of leg pieces and said portion of said leg pieces where said slits are located.

6. A metal corner fitting as defined in claim 1 in which said slits have a countersink formed where said slits are located on said leg pieces for forming an angle β between said flat plane top surface of leg pieces and said portion of said leg pieces where said slits are located.

* * * * *